(12) United States Patent
Assem Aly Salama et al.

(10) Patent No.: US 11,062,230 B2
(45) Date of Patent: Jul. 13, 2021

(54) DETECTING DATA ANOMALIES

(71) Applicant: INTERNATIONAL BUSINESS MACHINES CORPORATION, Armonk, NY (US)

(72) Inventors: Hitham A. Assem Aly Salama, Dublin (IE); Teodora S. Buda, Dublin (IE); Patrick J. O'Sullivan, Dublin (IE); Lei Xu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 852 days.

(21) Appl. No.: 15/444,584

(22) Filed: Feb. 28, 2017

(65) Prior Publication Data
US 2018/0247220 A1     Aug. 30, 2018

(51) Int. Cl.
*G06N 99/00* (2019.01)
*G06F 11/07* (2006.01)
*G06F 21/57* (2013.01)
*G06N 20/00* (2019.01)

(52) U.S. Cl.
CPC .................................. *G06N 20/00* (2019.01)

(58) Field of Classification Search
CPC .. G06N 20/00; G06N 99/005; H04L 63/1425; H04L 29/06; G06F 19/00; G06F 11/00; G06F 17/16; G01R 13/02
USPC ...................................................... 706/1-62
See application file for complete search history.

(56) References Cited

U.S. PATENT DOCUMENTS

| | | | |
|---|---|---|---|
| 9,134,347 B2 | 9/2015 | Niles et al. | |
| 10,135,850 B2* | 11/2018 | Brew | H04L 63/1425 |
| 2009/0193293 A1* | 7/2009 | Stolfo | G06F 21/564 |
| | | | 714/26 |
| 2013/0023282 A1* | 1/2013 | Lin | G01S 5/021 |
| | | | 455/456.1 |
| 2013/0046493 A1 | 2/2013 | Hoogs et al. | |
| 2017/0032130 A1* | 2/2017 | Joseph Durairaj | G06F 21/577 |
| 2017/0063905 A1* | 3/2017 | Muddu | G06F 3/0484 |
| 2019/0213446 A1* | 7/2019 | Tsou | G06K 9/6257 |

OTHER PUBLICATIONS

MarkSAIen et al. (2015). Incorporating the confidence in the training data into the ML model. StackExchange. (Year: 2015).*
Fu et al. (2009). Execution anomaly detection in distributed systems through unstructured log analysis. In 2009 ninth IEEE international conference on data mining, pp. 149-158. IEEE, 2009. (Year: 2009).*

* cited by examiner

*Primary Examiner* — Brandon S Cole
(74) *Attorney, Agent, or Firm* — Griffiths & Seaton PLLC

(57) ABSTRACT

Embodiments for detecting data anomalies by a processor. A machine learning model may be trained according to collected scores and anomaly labels of a plurality of anomaly detection operations applied to one or more data sets such that the collected scores and labels identify a degree of accuracy of estimating anomalies for each of the plurality of anomaly detection operations. An anomaly may be detected in an unstructured data set by applying the trained machine learning model on an unstructured data set.

17 Claims, 7 Drawing Sheets

DETECTING DATA ANOMALIES

BACKGROUND OF THE INVENTION

Field of the Invention

The present invention relates in general to computing systems, and more particularly to various embodiments for detecting anomalies in a data set by one or more processors.

Description of the Related Art

Computing systems may be found in the workplace, at home, or at school. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information or data has provided many opportunities.

As the technology field grows exponentially each year and ever-growing amounts of data are stored, retrieved, and accessed on computing systems, the need to ensure data integrity becomes increasingly paramount. Consequently, the need for advancement in the data storage and computing field is of great precedence.

SUMMARY OF THE INVENTION

Various embodiments for detecting anomalies in data set anomalies by a processor, are provided. In one embodiment, by way of example only, a method for detecting data anomalies, again by a processor, is provided. A machine learning model may be trained according to collected scores and anomaly labels of a plurality of anomaly detection operations applied to one or more data sets such that the collected scores and labels identify a degree of accuracy of estimating anomalies for each of the plurality of anomaly detection operations. An anomaly may be detected in an unstructured data set by applying the trained machine learning model on an unstructured data set. The training environment may be a virtualized computing environment that may employ machine learning and may also be part of an Internet of Things (IoT) network.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
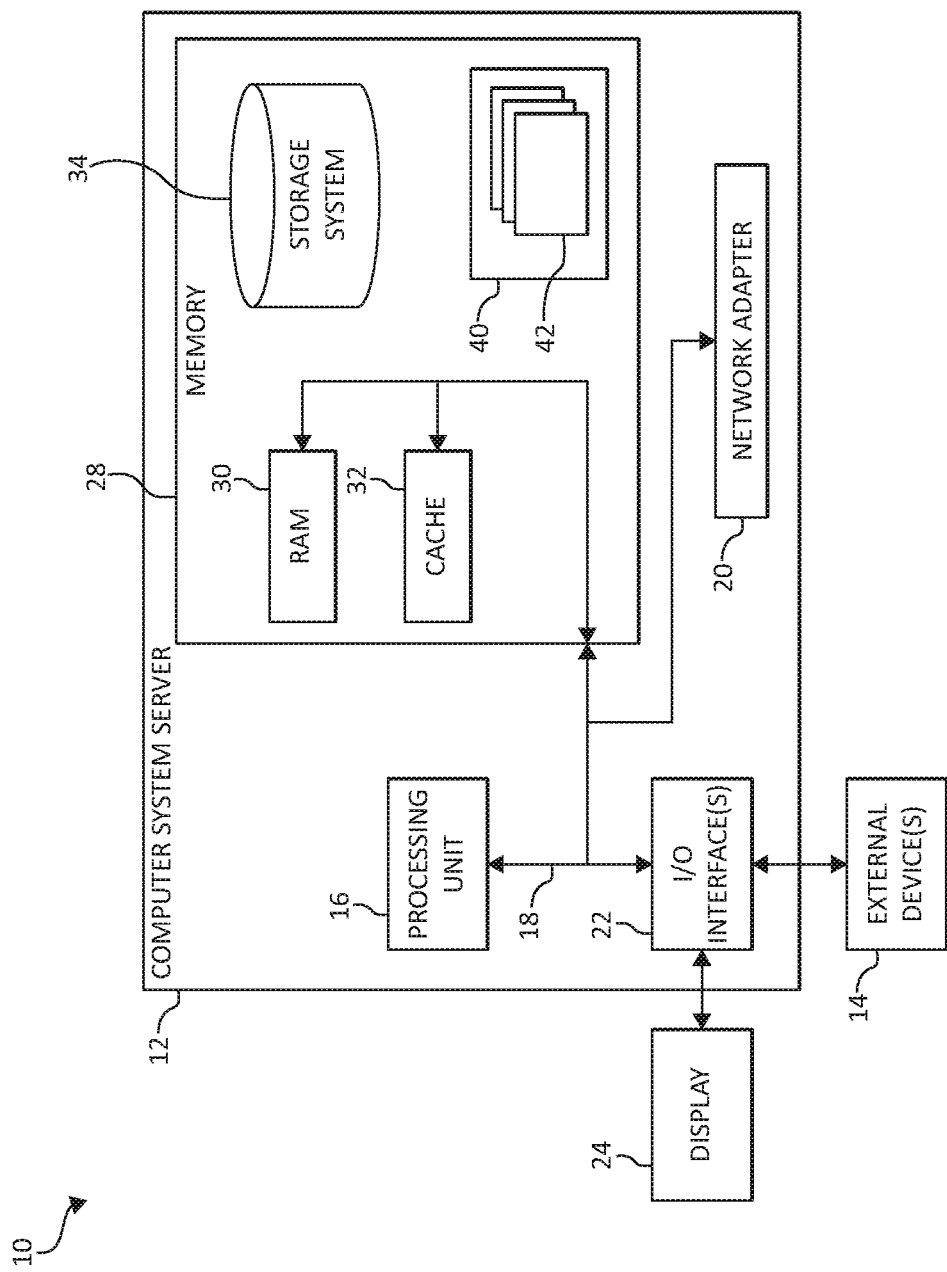
FIG. 1 is a block diagram depicting an exemplary cloud computing node according to an embodiment of the present invention.

As computing systems, particularly computing applications, become increasingly complex, it is desirable to be able to detect instances within data such as a set of data that may be said to differ from the rest sufficiently to constitute outliers or anomalies. Moreover, anomaly detection may be referred to as the act of detecting patterns in a given data set that do not conform to an established normal behavior. Said differently, anomaly detection may be the act of identifying patterns that deviate from expected behaviors. For example, anomaly detection may be applied in a variety of applications, such as fraud detection for banking and financial industries, intrusion and anomalous traffic pattern detection for cyber-security, and performance degradation for network management. As an additional example, anomaly detection may be employed in the medical domain where it is critical to identify one or more changes in biomedical and/or physiological parameters such as, for example, heart rate in patients undergoing continuous monitoring, or abnormalities in the appearance of the brain on magnetic resonance or computed tomography scans.

Various embodiments described herein may include performing one or more anomaly detection operations. For example, an anomaly detection operation may be performed by statistical techniques such as, for example, Multivariate Adaptive Statistical Filtering (MASF) or machine learning techniques such as clustering and nearest neighbor based detection algorithms. In one aspect, for arbitrary applications, it may often not be possible to use off-the-shelf algorithms/techniques since there is no algorithm/technique working perfectly for all types of anomalies, which is known as the "no free lunch" theorem. It is common to try multiple models and then find out one that works best for a particular problem. However, a need exists for identifying one of a plurality of anomaly detection operations that is an optimal or "best" anomaly detection operation for a particular problem.

Thus, the present invention provides for detecting data anomalies by one or more processors. A machine learning model may be trained according to collected scores and anomaly labels of a plurality of anomaly detection operations applied to one or more data sets such that the collected scores and labels identify a degree of accuracy of estimating anomalies for each of the plurality of anomaly detection operations. An anomaly may be detected in an unstructured data set by applying the trained machine learning model on an unstructured data set. The training environment may be a virtualized computing environment that may employ machine learning and may also be part of an Internet of Things (IoT) network.

To further illustrate the various embodiments described herein, for a given a set of labeled data sets such as, for example, D1 . . . Dn, the proposed anomaly detection system employs multiple anomaly detection operations in order to learn the accuracy of each of the anomaly detection techniques. Further, given an unlabeled data set Dn+1, the objective is to provide a more accurate estimation of the presence of an anomaly in Dn+1 than a single technique.

Accordingly, the present invention detects anomalies based on a machine learning model trained on the outputs of the various anomaly detection operations. An additional input for the trained ML model improves its accuracy by including characteristics of the data sets. The trained ML model learns over time the estimation of each of the anomaly detection operations, and outputs anomaly scores identifying a degree to which an instance is considered as anomaly or anomaly labels. Said differently, the mechanisms of the various embodiments can be enhanced by collecting characteristics of the target data set in order to learn the accuracy of anomaly detection operations depending on the data set. In this way, the present invention may be used for selecting an anomaly detection operation based on the data set characteristics, thus avoiding the difficult, time-consuming, and error-prone tuning and selection of anomaly detection techniques through trial and error experimentation.

In one aspect, the present invention consolidates a plurality of anomaly detection operations that enable a systematic and automatic ensemble model for anomaly detection for an unlabeled and unknown data set, while ensuring the accuracy of anomaly detection. In this way, the present invention provides increased efficiency over finding a single anomaly detection operation, which can be a time-consuming and expensive process, which requires deep knowledge on the target problem. Meanwhile, as the complexity of systems and size of collected data are constantly increasing, the present invention provides additional benefits by automatically selecting and tuning the plurality of anomaly detection operations for anomaly detection for an unlabeled and unknown data set while decreasing computing inefficiency and cost.

It should also be noted that data is increasingly processed through a variety of geographically disbursed computing components, where, for example, a local node may contain a set of data or "data set" processing components yet remain in remote communication with other portions of the distributed data processing system. To wit, an ML model may be employed for one or more IoT devices with data that may not be locally stored or processed on the user's local computer, but that is instead hosted by one or more distributed storage components that are in remote communication with the local computer. This type of data storage may, in some cases, be referred to as "cloud" or "cloud-based" storage.

It is understood in advance that although this disclosure includes a detailed description on cloud computing, implementation of the teachings recited herein are not limited to a cloud computing environment or Internet of Things (IoT) network environment. Rather, embodiments of the present invention are capable of being implemented in conjunction with any other type of computing environment now known or later developed. It should be noted that the IoT is an emerging concept involving computing devices that may be embedded in objects, such as appliances, and connected through a network. An IoT network may include one or more IoT devices or "smart devices", which are physical objects such as appliances with computing devices embedded therein. Many IoT devices are independently operable, but they also may be paired with a control system or with a distributed control system such as one running over a cloud computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
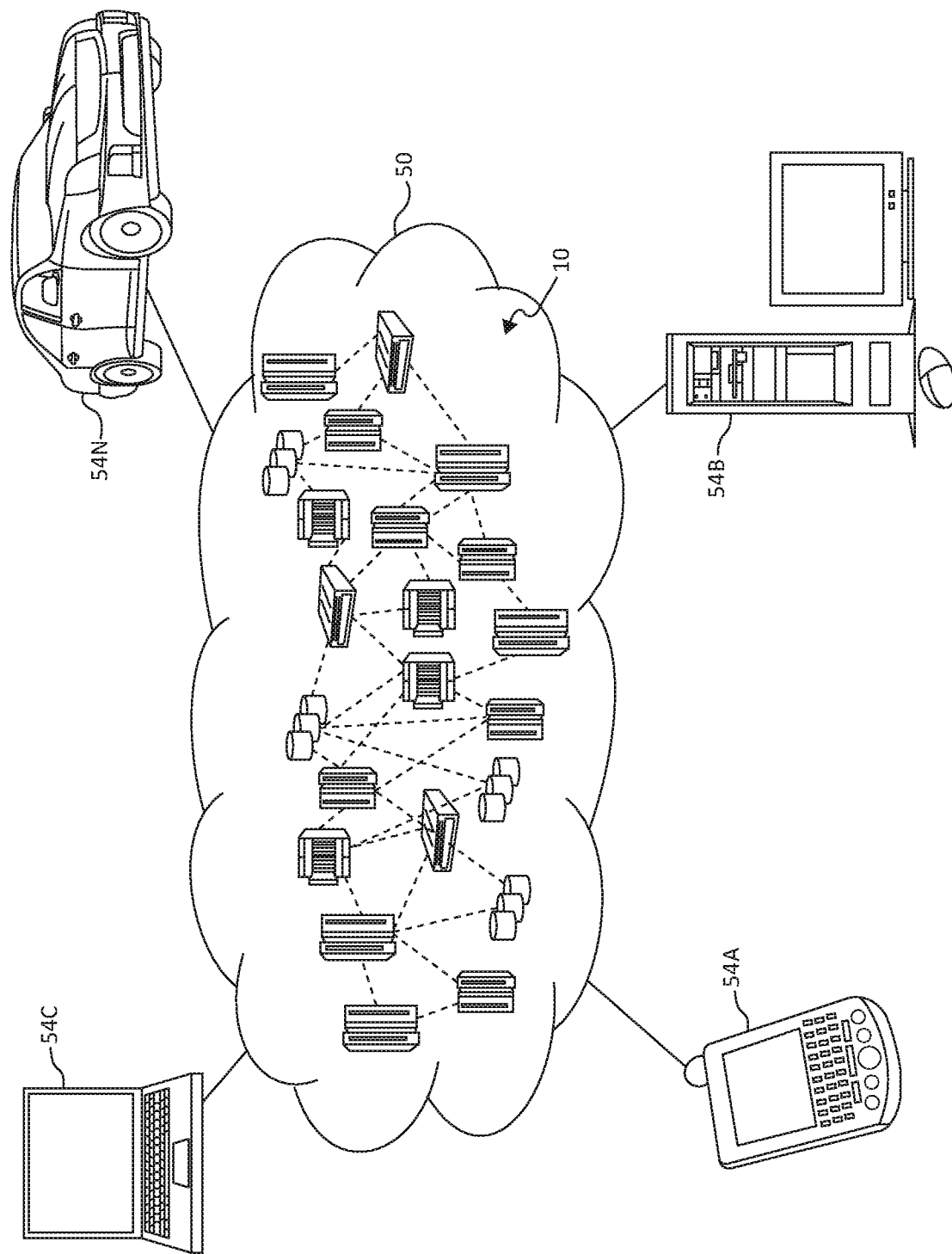
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
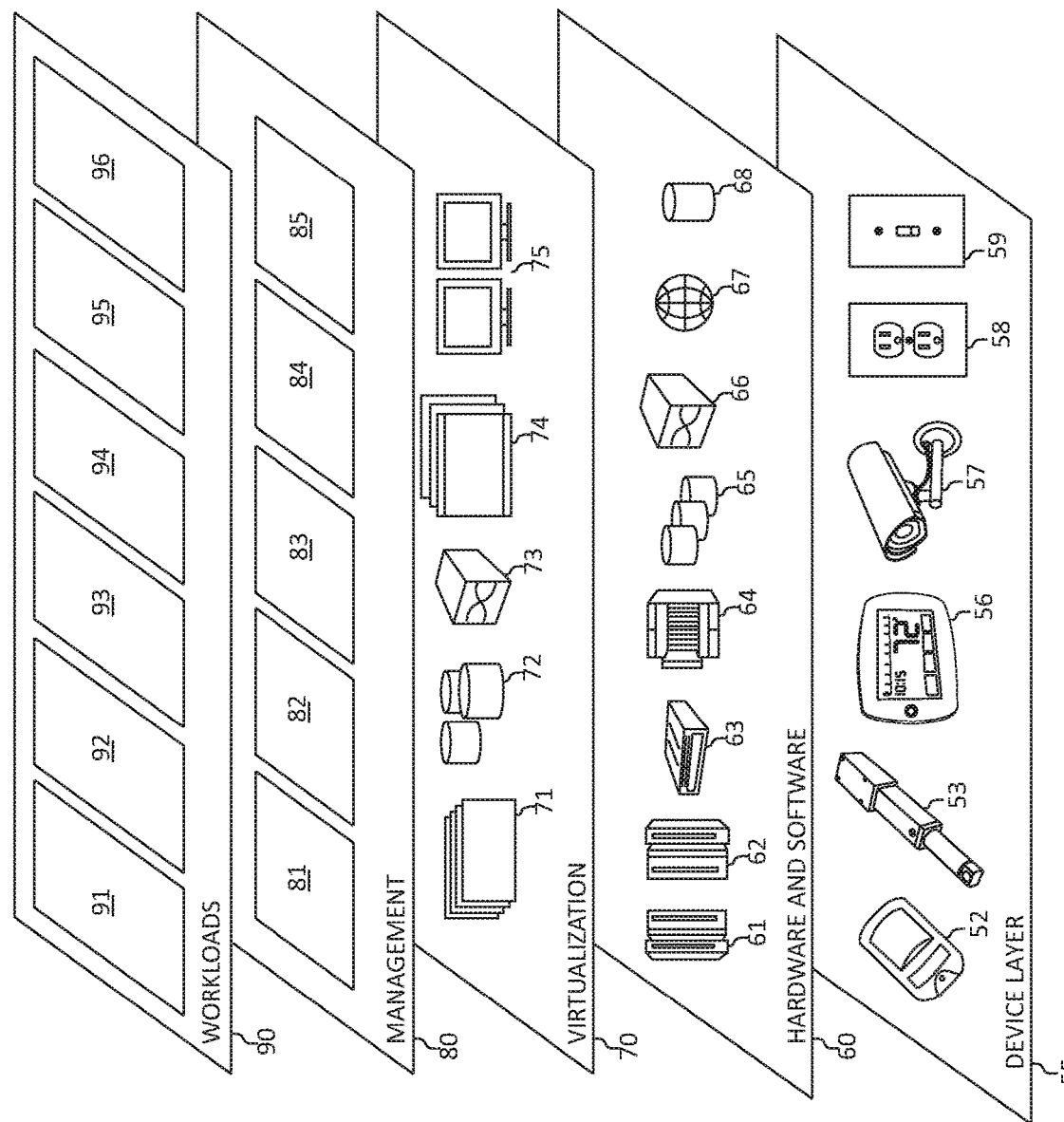
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various computer-controlled devices for detecting anomalies in a data set workloads and functions 96. In addition, configuring settings for various computer-controlled devices using workloads and functions 96 for detecting anomalies in a data set may include such operations as data analysis (including data collection and processing from various environmental sensors), semantic analysis, image analysis, control input analysis, device analysis, and/or data analytics functions. One of ordinary skill in the art will appreciate that the configuring settings for various computer-controlled devices using workloads and functions 96 for detecting anomalies in a data set may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
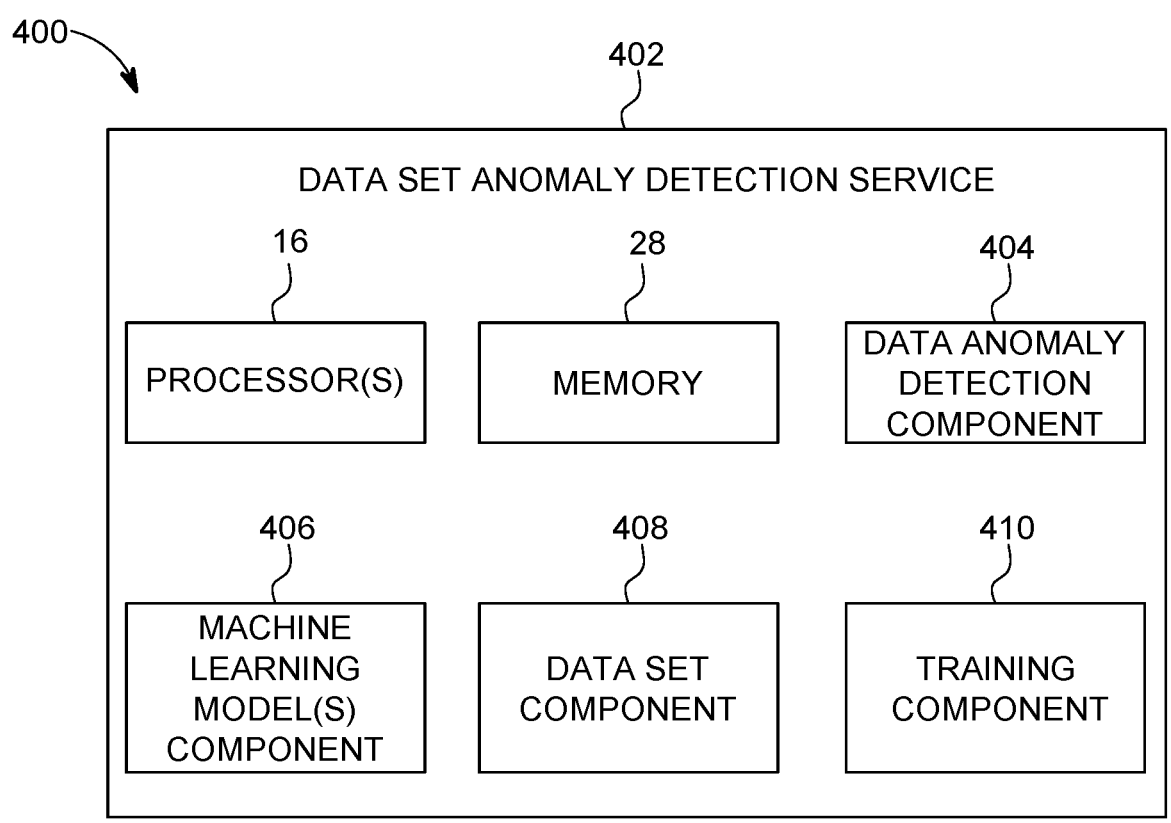
FIG. 4 is an additional block diagram depicting cognitive control system architecture according to an embodiment of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4. For example, computer system/server 12 of FIG. 1 may be included in FIG. 4 and may be connected to other computing nodes (such as computer systems of vehicles) over a distributed computing network, where additional data collection, processing, analytics, and other functionality may be realized. The components of computer system/server 12 may include, but are not limited to, one or more processors or processing units 16, a system memory 28, and a bus 18 that couples various system components including system memory 28 to processor 16.

The computer system/server 12 of FIG. 1, may include a data set anomaly detection service 402, along with other related components in order to apply data anomaly detection operations on data sets. The data sets may be in the form of records, objects, and/or documents. The data set anomaly detection service 402 may perform data anomaly detection operations without using any deterministic or external mapping based services.

The data set anomaly detection service 402 may include and/or be associated with one or more data anomaly detection components 404, one or more machine learning (ML) models of a machine learning model(s) component 406, data set component 408, and a training component 410 (e.g., an ML model training component).

The training component 410 may train a machine learning (ML) model to detect anomalies in a data set of the data set component 408. One or more ML models of the ML model component 406 may be trained by analyzing output of anomaly detection operations, services, or techniques such as, for example, one or more data anomaly detection services of the data anomaly detection component 404, applied on each data set.

The data set anomaly detection component 402 working in conjunction with the ML model component 406, may identify a best or "optimal" one or more data anomaly detection services out of a plurality of anomaly detection operations by collecting scores/labels for each anomaly applied on the data set. Said differently, the machine learning models of the ML model component 406 may be trained according to collected scores and anomaly labels of a plurality of anomaly detection operations applied to one or more data sets such that the collected scores and labels identify a degree of accuracy of estimating anomalies for each of the anomaly detection operations of the data anomaly detection component 404.

The ML model component 406 may detect an anomaly in an unstructured data set, which may be associated with data set component 408, by applying one of the trained machine learning models on an unstructured data set.

The ML model component 406 may be implemented for learning behavior of the plurality of anomaly detection operations applied to one or more data sets, such as those associated with the data set component 408, over a selected period of time. A weight may be assigned to each one of the plurality of anomaly detection operations, such as those associated with the data anomaly detection component 404. That ML model component 406 may learn automatically over time the accuracy of each one of the plurality of anomaly detection operations based on the type of data set and learns weights to apply to each technique automatically based on the prior learning (it is not a manual selection, assigning of weights and so on).

In one aspect, the output of each of the anomaly detection operations may be leveraged to compute a final score by automatically leveraging an ML model that is capable of learning over time, based on data set characteristics, which weights to assign to each technique.

The ML model component 406 may also include providing feedback and updating existing knowledge or learning behavior associated with the training component 410, resulting in adaptation of cognitive functionalities to changing environmental situations and contexts for training one or more new or additional machine learning models. The knowledge provided as feedback to the training component 410 may be continuously updated, may modulate a task execution at runtime, and may be a representational formalism for knowledge, such as the choice of representational primitives, compositions, and structures.

In one aspect, the various functional units associated with the ML model component 406 and/or training component 410 may apply one or more heuristics and machine learning based models using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

In one aspect, any operation described herein for determining, estimating, and/or calculating may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Figure 5A:
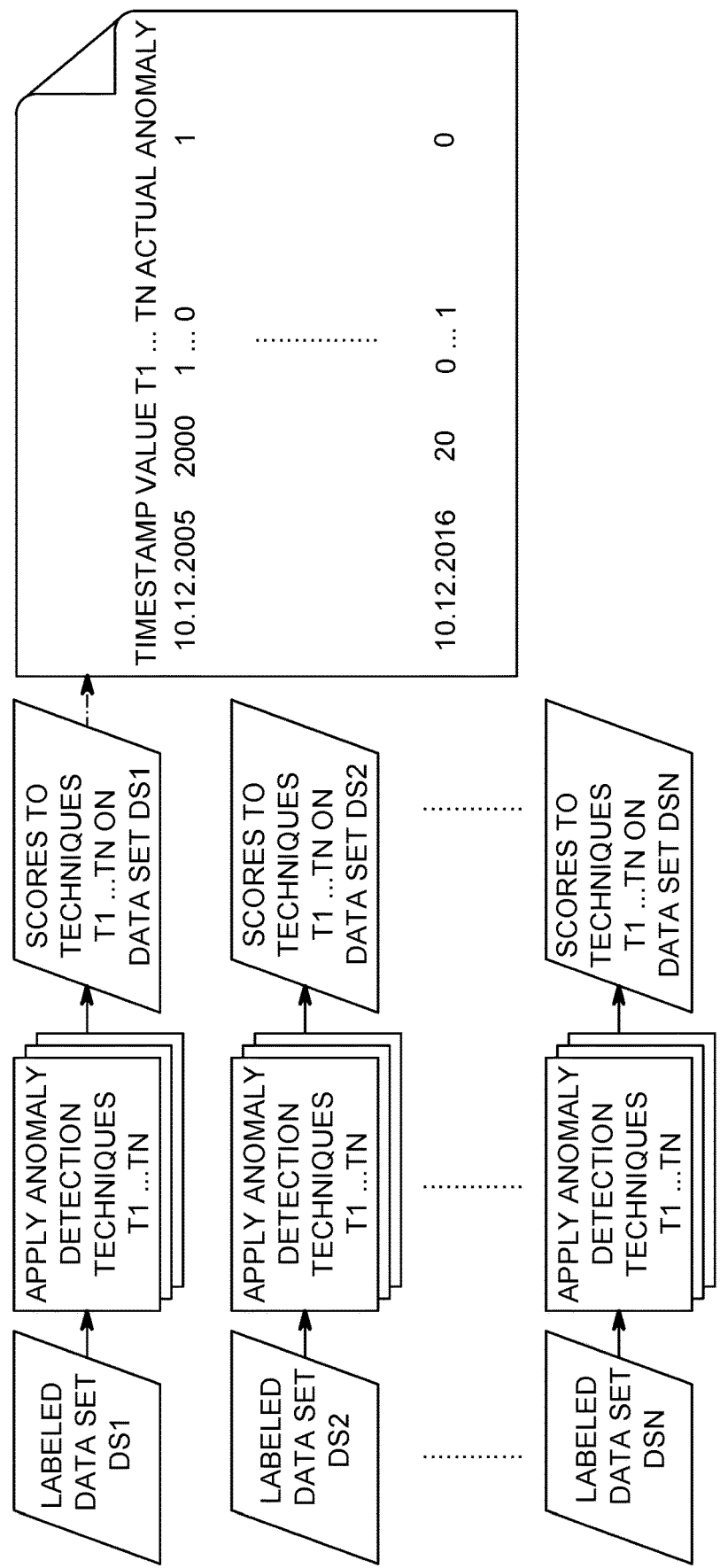
FIG. 5A is an additional diagram depicting a flow operation for collecting scores of one or more anomaly detection operations on labeled data sets in accordance with aspects of the present invention.
Figure 5B:
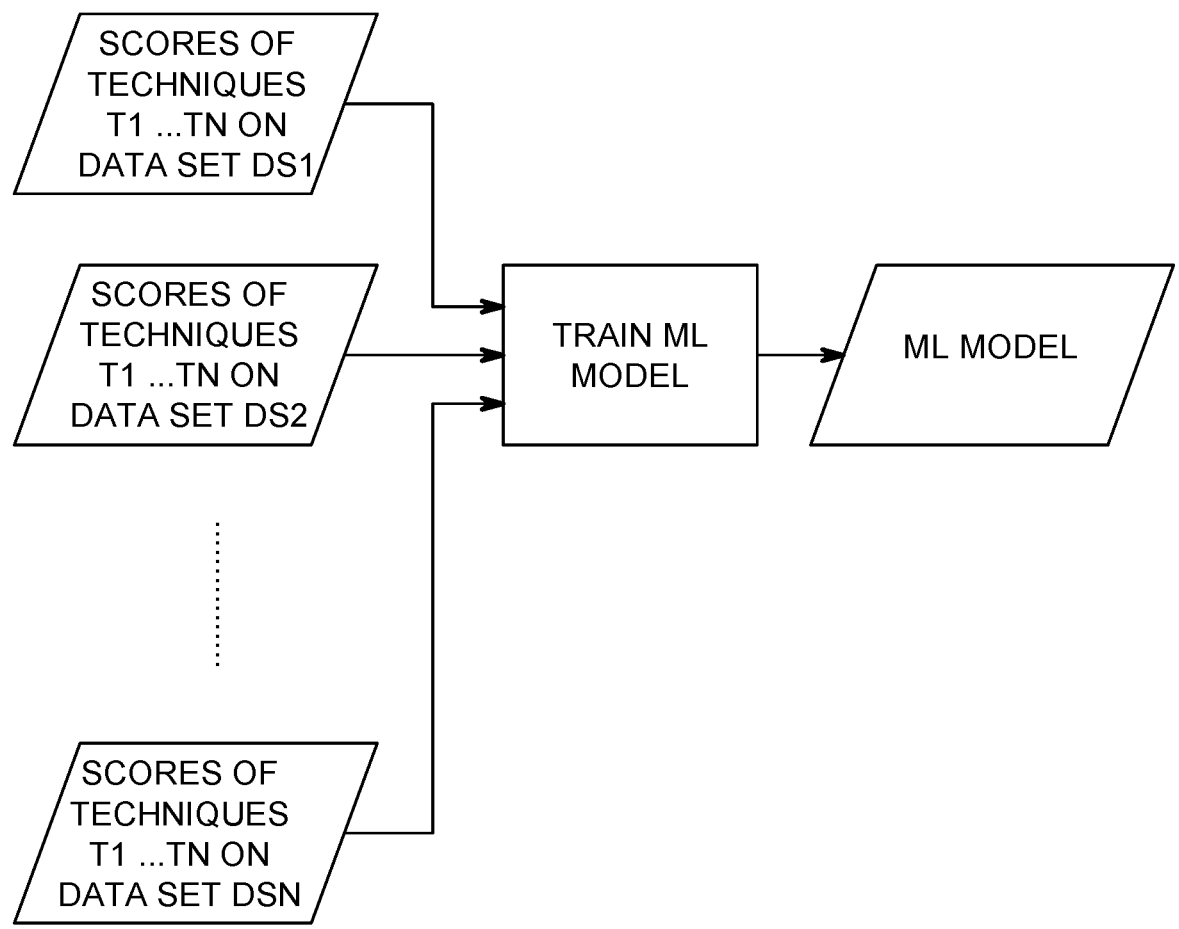
FIG. 5B is an additional diagram depicting a flow operation for training a machine learning (ML) model based on scores of the anomaly detection operations collected in FIG. 5C in accordance with aspects of the present invention.

In view of the foregoing, consider now the following examples depicted in FIGS. 5A-B. FIG. 5A depicts a flow operation for collecting scores of one or more anomaly detection operations on labeled data sets. In one aspect, each of the devices, components, modules, and/or functions described in FIGS. 1-4 also may apply to the devices, components, modules, and functions of FIGS. 5A-5B. Also, one or more of the operations and steps of FIGS. 1-4 may be included in one or more operations or actions of FIGS. 5A-5B.

For example, given a set of labeled data sets such as, for example, data sets DS1, DS2, and DSn, one or more anomaly detection operations such as, anomaly detection techniques T1 . . . Tn, may be applied on the labeled data sets such as, for example, datasets DS1, DS2, and DSn and gather for each data point whether the data set was scored an anomaly (e.g., a value of "1") or no anomaly (e.g., a value of "0"). The output may be a set of files, each containing scores for each labeled data set such as, for example, data sets DS1, DS2, and DSn gathered from applying the one or more anomaly detection operations. A timestamp may be created each time each data point was scored whether the data set was scored an anomaly (e.g., a value of "1") or no anomaly (e.g., a value of "0").

Figure 5C:
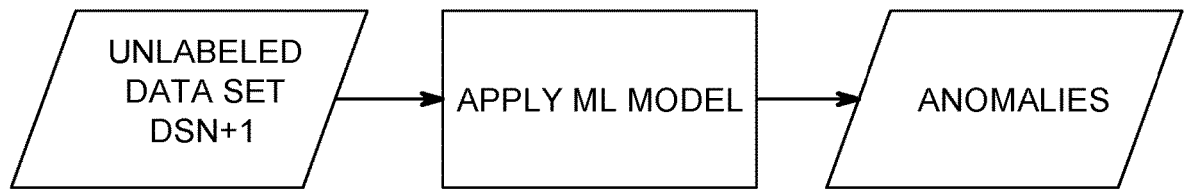
FIG. 5C is an additional diagram depicting a flow operation for applying a machine learning (ML) model trained in FIG. 5B to determine anomalies for an unlabeled data set in accordance with aspects of the present invention.

Turning now to FIG. 5B, a flow operation for training a machine learning (ML) model based on scores of the anomaly detection operations collected in FIG. 5C is depicted. One or more machine learning models (e.g., a neural net or gradient boosting tree) may be trained based on the scores of the one or more anomaly detection operations gathered from FIG. 5A and the ground truth that may exist in the labeled data sets. The trained ML model may use as input for an incoming data point the scores of each individual anomaly detection operation (e.g. anomaly detection techniques T1 . . . Tn) employed and the label of the data set as to whether an anomaly (e.g., a value of "1") or no anomaly (e.g., a value of "0") was scored. Once the ML model is trained, the output of the ML model may be whether or not a data point is anomalous.

Finally, as depicted in FIG. 5C, the flow operation illustrates applying a machine learning (ML) model trained in FIG. 5B to determine anomalies for an unlabeled data set. The ML model trained in FIG. 5B may be used for a new unlabeled data set such as, for example, unlabeled data set DSn+1 (e.g., a stream of performance measurements) to estimate whether or not any of the incoming data points are anomalies.

Figure 6:
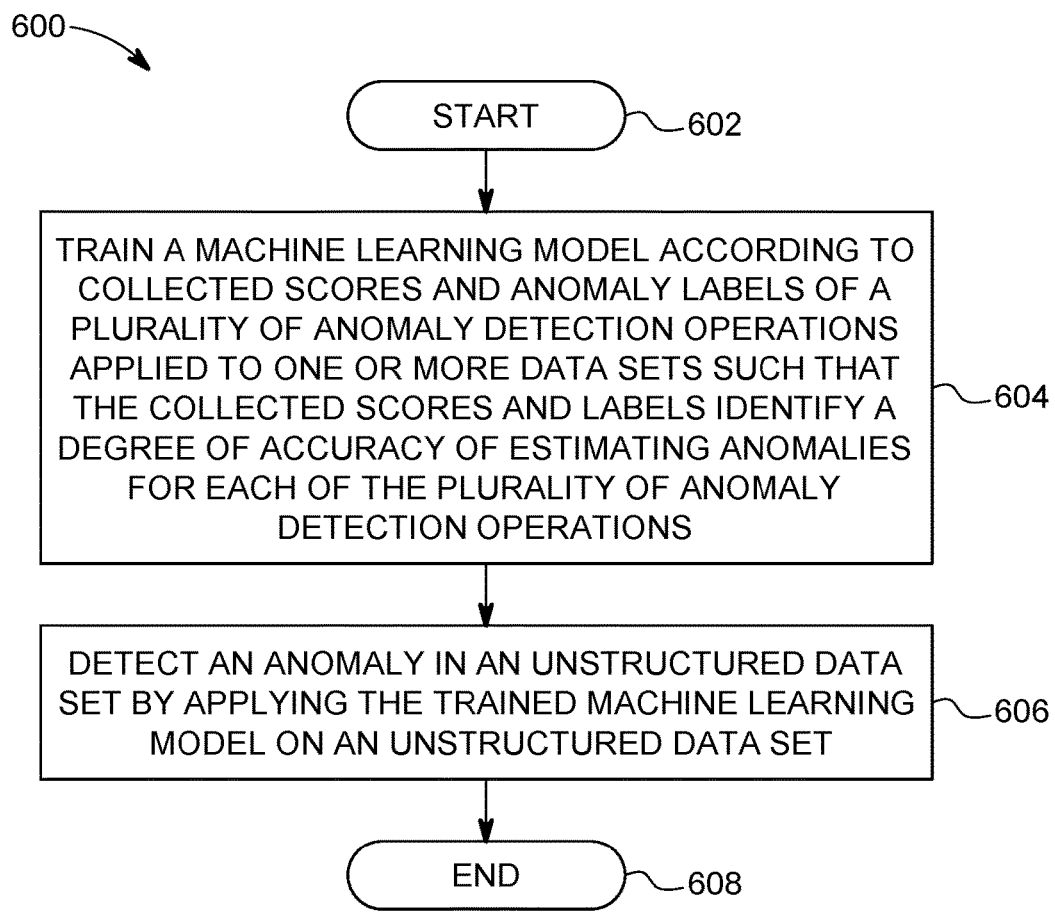
FIG. 6 is an additional flowchart diagram depicting an exemplary method for detecting data anomalies by a processor; again, in which aspects of the present invention may be realized.

Turning now to FIG. 6, a method 600 for detecting data anomalies, by a processor, is depicted. In one aspect, each of the devices, components, modules, and/or functions described in FIGS. 1-5 also may apply to the devices, components, modules, and functions of FIG. 6. Also, one or more of the operations and steps of FIGS. 1-5 may be included in one or more operations or actions of FIG. 6. The functionality 600 may be implemented as a method executed as instructions on a machine, where the instructions are included on at least one computer readable medium or one non-transitory machine readable storage medium. The functionality 600 may start in block 602. A machine learning model may be trained according to collected scores and anomaly labels of a plurality of anomaly detection operations applied to one or more data sets such that the collected scores and labels identify a degree of accuracy of estimating anomalies for each of the plurality of anomaly detection operations, as in block 604. An anomaly may be detected in an unstructured data set by applying the trained machine learning model on an unstructured data set, as in block 606. The functionality 600 may end, as in block 608.

In one aspect, in conjunction with and/or as part of at least one block of FIG. 6, the operations of method 600 may include each of the following. The operations of method 600 may include collecting each score and anomaly label of each of the plurality of anomaly detection operations applied to one or more data sets over a selected period of time. The anomaly label indicates the presence or absence of an anomaly on a data set. Training the machine learning model further includes learning one or more characteristics of the one or more data sets.

The operations of method 600 may include learning over a selected period of time by the trained machine learning model the degree of accuracy of estimating anomalies on a data set by each of the plurality of anomaly detection operations. The input of the trained machine learning model may be and/or use a score and anomaly label for each of the plurality of anomaly detection operations. The anomaly may be estimated for/in the unstructured data set according to an anomaly score determined by the trained machine learning model on the unstructured data set. A machine learning mechanism may be implemented for learning behavior of the plurality of anomaly detection operations applied to one or more data sets over a selected period of time. A weight may be assigned to each one of the plurality of anomaly detection operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for detecting data anomalies by a processor, comprising:
    performing a plurality of anomaly detection operations on a labeled data set, wherein each of the plurality of anomaly detection operations comprises a differing statistical technique or machine learning algorithm;
    scoring each of the plurality of anomaly detection operations according to anomaly labels respectively output by each of the anomaly detection operations, wherein each score is collected and identifies a degree of accuracy of estimating anomalies by each respective anomaly detection operation according to ground truth data associated with the labeled data set;
    assigning a weight to each of the plurality of anomaly detection operations according to the collected score representative of the degree of accuracy of estimating anomalies, wherein the weight corresponds to tuning parameters of the differing statistical techniques or machine learning algorithms according to the degree of accuracy associated therewith;
    training a machine learning model according to the collected scores and anomaly labels output from the plurality of anomaly detection operations, wherein the machine learning model is trained using, for each incoming data point of the labeled data set, the collected score and the anomaly label generated from each differing statistical technique or machine learning algorithm of the plurality of anomaly detection operations performed on the incoming data point, and wherein respective parameters of the plurality of anomaly detection operations are used as input in the training of the machine learning model according to the assigned weight of the respective anomaly detection operation to which the respective parameters were implemented; and
    detecting an anomaly in an unstructured data set by applying the trained machine learning model on the unstructured data set.

2. The method of claim 1, wherein training the machine learning model further includes collecting each score and anomaly label of each of the plurality of anomaly detection operations applied to one or more data sets over a selected period of time, wherein the anomaly label indicates the presence or absence of an anomaly on a data set.

3. The method of claim 1, wherein training the machine learning model further includes learning one or more characteristics of the one or more data sets.

4. The method of claim 1, further including learning over a selected period of time by the trained machine learning model the degree of accuracy of estimating anomalies on a data set by each of the plurality of anomaly detection operations.

5. The method of claim 1, further including estimating the anomaly in the unstructured data set according to an anomaly score determined by the trained machine learning model on the unstructured data set.

6. The method of claim 1, further including initializing a machine learning mechanism for learning behavior of the plurality of anomaly detection operations applied to one or more data sets over a selected period of time.

7. A system for detecting data anomalies, comprising:
one or more computers with executable instructions that when executed cause the system to:
perform a plurality of anomaly detection operations on a labeled data set, wherein each of the plurality of anomaly detection operations comprises a differing statistical technique or machine learning algorithm;
score each of the plurality of anomaly detection operations according to anomaly labels respectively output by each of the anomaly detection operations, wherein each score is collected and identifies a degree of accuracy of estimating anomalies by each respective anomaly detection operation according to ground truth data associated with the labeled data set;
assign a weight to each of the plurality of anomaly detection operations according to the collected score representative of the degree of accuracy of estimating anomalies, wherein the weight corresponds to tuning parameters of the differing statistical techniques or machine learning algorithms according to the degree of accuracy associated therewith;
train a machine learning model according to the collected scores and anomaly labels output from the plurality of anomaly detection operations, wherein the machine learning model is trained using, for each incoming data point of the labeled data set, the collected score and the anomaly label generated from each differing statistical technique or machine learning algorithm of the plurality of anomaly detection operations performed on the incoming data point, and wherein respective parameters of the plurality of anomaly detection operations are used as input in the training of the machine learning model according to the assigned weight of the respective anomaly detection operation to which the respective parameters were implemented; and
detect an anomaly in an unstructured data set by applying the trained machine learning model on the unstructured data set.

8. The system of claim 7, wherein training the machine learning model further includes collecting each score and anomaly label of each of the plurality of anomaly detection operations applied to one or more data sets over a selected period of time, wherein the anomaly label indicates the presence or absence of an anomaly on a data set.

9. The system of claim 7, wherein training the machine learning model further includes learning one or more characteristics of the one or more data sets.

10. The system of claim 7, wherein training the machine learning model further includes learning over a selected period of time by the trained machine learning model the degree of accuracy of estimating anomalies on a data set by each of the plurality of anomaly detection operations.

11. The system of claim 7, wherein the executable instructions estimate the anomaly in the unstructured data set according to an anomaly score determined by the trained machine learning model on the unstructured data set.

12. The system of claim 7, wherein the executable instructions initialize a machine learning mechanism for learning behavior of the plurality of anomaly detection operations applied to one or more data sets over a selected period of time.

13. A computer program product for detecting data anomalies by a processor, the computer program product comprising a non-transitory computer-readable storage medium having computer-readable program code portions stored therein, the computer-readable program code portions comprising:
an executable portion that performs a plurality of anomaly detection operations on a labeled data set, wherein each of the plurality of anomaly detection operations comprises a differing statistical technique or machine learning algorithm;
an executable portion that scores each of the plurality of anomaly detection operations according to anomaly labels respectively output by each of the anomaly detection operations, wherein each score is collected and identifies a degree of accuracy of estimating anomalies by each respective anomaly detection operation according to ground truth data associated with the labeled data set;
an executable portion that assigns a weight to each of the plurality of anomaly detection operations according to the collected score representative of the degree of accuracy of estimating anomalies, wherein the weight corresponds to tuning parameters of the differing statistical techniques or machine learning algorithms according to the degree of accuracy associated therewith;
an executable portion that trains a machine learning model according to the collected scores and anomaly labels output from the plurality of anomaly detection operations, wherein the machine learning model is trained using, for each incoming data point of the labeled data set, the collected score and the anomaly label generated from each differing statistical technique or machine learning algorithm of the plurality of anomaly detection operations performed on the incoming data point, and wherein respective parameters of the plurality of anomaly detection operations are used as input in the training of the machine learning model according to the assigned weight of the respective anomaly detection operation to which the respective parameters were implemented; and
an executable portion that detects an anomaly in an unstructured data set by applying the trained machine learning model on the unstructured data set.

14. The computer program product of claim 13, wherein training the machine learning model further includes:
collecting each score and anomaly label of each of the plurality of anomaly detection operations applied to one or more data sets over a selected period of time, wherein the anomaly label indicates the presence or absence of an anomaly on a data set; or
learning one or more characteristics of the one or more data sets.

15. The computer program product of claim 13, wherein training the machine learning model further includes learning over a selected period of time by the trained machine learning model the degree of accuracy of estimating anomalies on a data set by each of the plurality of anomaly detection operations.

16. The computer program product of claim 13, further including an executable portion that estimates the anomaly in the unstructured data set according to an anomaly score determined by the trained machine learning model on the unstructured data set.

17. The computer program product of claim 13, further including an executable portion that initializes a machine learning mechanism for learning behavior of the plurality of anomaly detection operations applied to one or more data sets over a selected period of time.

\* \* \* \* \*